United States Patent
Beaulieu et al.

[15] 3,696,307
[45] Oct. 3, 1972

[54] CAPACITOR LASER

[72] Inventors: Alexander J. Beaulieu, Ste. Foy, Quebec; Derwyn C. Johnson, Ottawa, Ontario, both of Canada

[73] Assignee: Her Majesty the Queen in right of Canada as represented by the Minister of National Defence of Her Majesty's Canadian Government

[22] Filed: Aug. 20, 1970

[21] Appl. No.: 65,477

[30] Foreign Application Priority Data

Aug. 29, 1969 Canada.....................060,719

[52] U.S. Cl..............................................331/94.5
[51] Int. Cl.............................................H01s 3/09

[58] Field of Search......................331/94.5; 330/4.3

[56] References Cited

UNITED STATES PATENTS 3,543,179 11/1970 Wilson......................331/94.5
3,577,096 5/1971 Bridges et al.............331/94.5

*Primary Examiner*—William L. Sikes
*Attorney*—John W. Malley

[57] ABSTRACT

A transverse excitation system for molecular gas laser is disclosed which includes a capacitor in series with a plurality of electrodes forming one side of the transverse excitation system which electrodes discharge to opposing electrodes.

1 Claim, 3 Drawing Figures

PATENTED OCT 3 1972

3,696,307

SHEET 1 OF 2

CAPACITOR LASER

The present invention relates to apparatus for the generation of intense coherent radiation in discrete pulses. The present application is directed to an improvement to the invention disclosed in Beaulieu U.S. application Ser. No. 731,693 and constitutes additional embodiments to the structures disclosed and claimed in that application.

In the transverse excitation schemes for molecular laser excitation such as that described in U.S. Pat. application Ser. No. 731,693 the prime objective is to excite the laser gas mix by a transverse electrical discharge which is distributed uniformly over the length of the lasing cavity. The use of a multiplicity of resistively stabilized electrodes will give this type of distributed discharge at the expense of power loss in the resistors. The uniformity of the discharge is not always perfect; especially if excessive energy is applied.

An alternative to get an evenly distributed excitation discharge is to store the electrical energy in a multiplicity of condensers rather than in a single one, and to cause these condensers to discharge simultaneously by the closing of a single common switch, the discharge paths of the condensers in the laser cavity being different for each condenser. Thus it is possible to release the stored electrical energy very uniformly over the laser cavity length and even in the advent of the failure of one of the electrodes, the energy distribution is still maintained nearly uniform.

Figure 1:
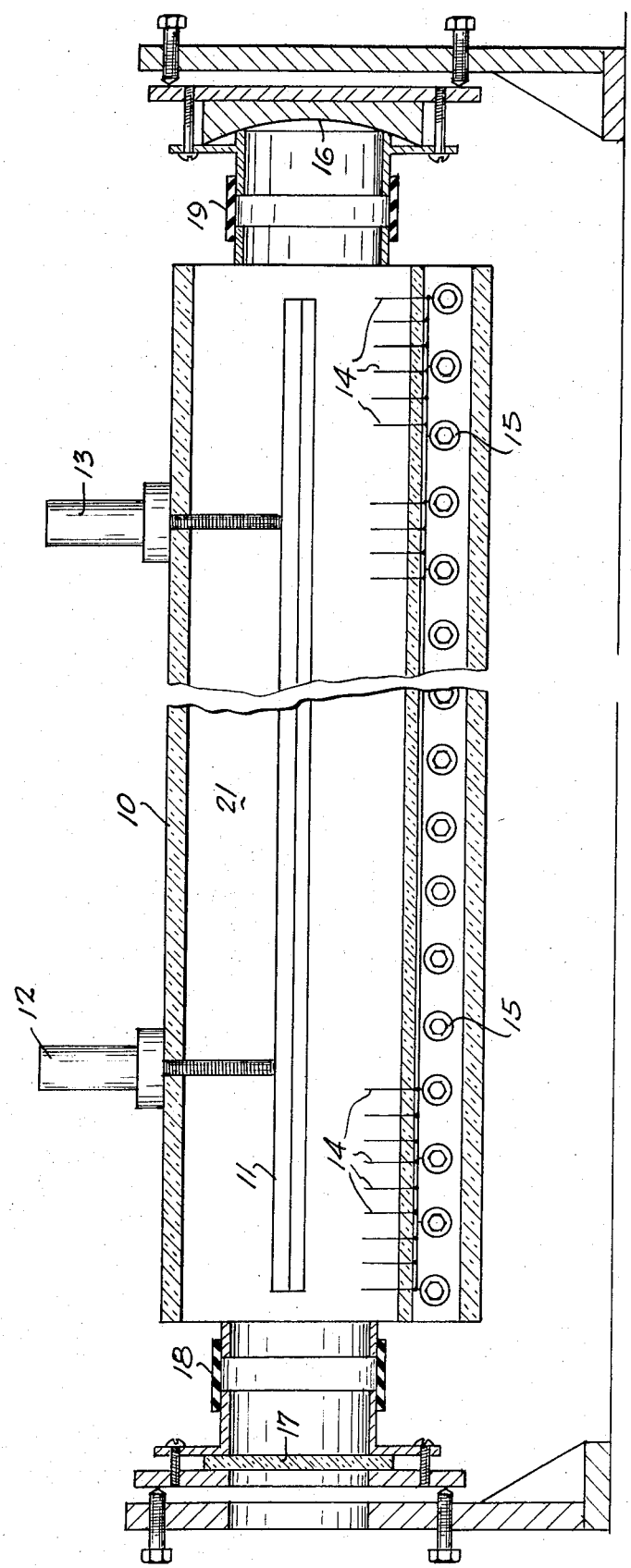
Figure 2:
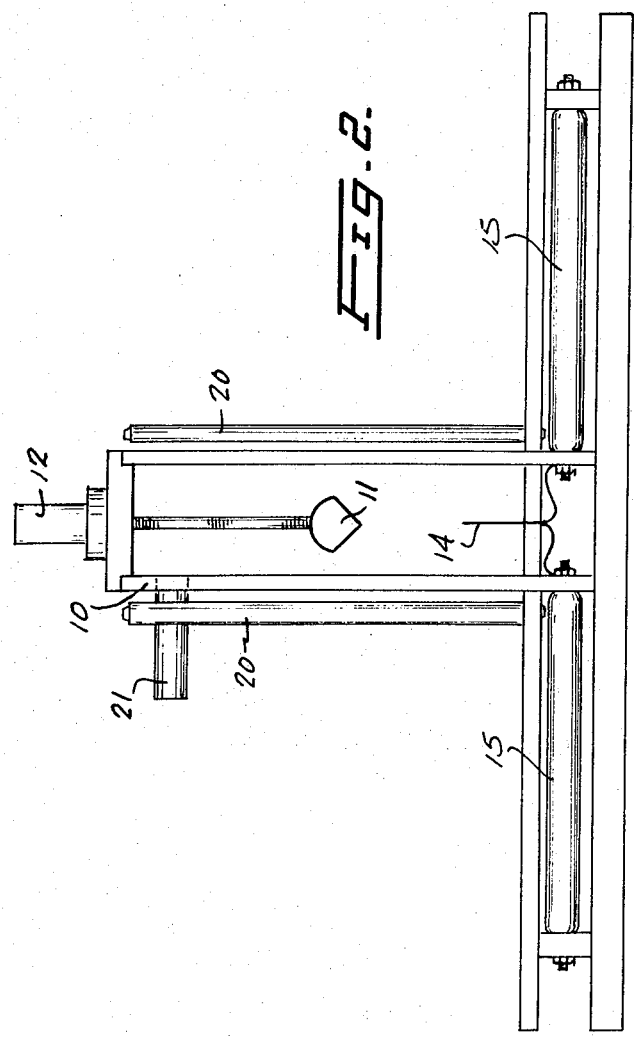
Figure 3:
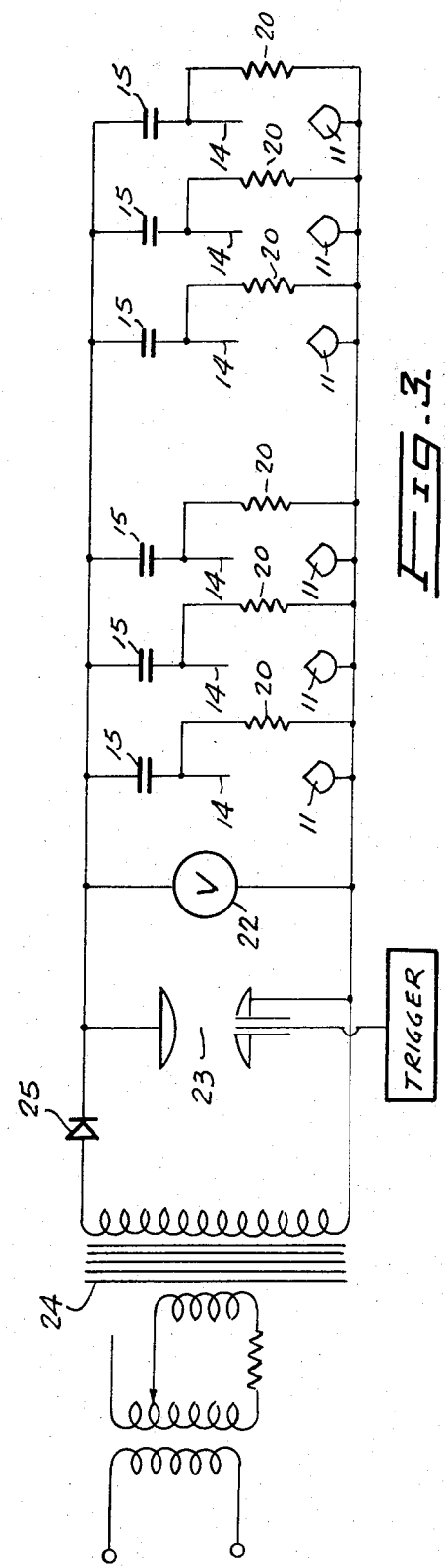

The present invention will be explained with reference to the accompanying drawings in which FIG. 1 is a longitudinal section through an embodiment of the invention, FIG. 2 is a transverse section of the embodiment of FIG. 1, and FIG. 3 is an electrical schematic of the embodiment of FIGS. 1 and 2.

Referring to FIGS. 1 and 2 there is shown a molecular laser capable of operating at atmospheric pressure and including an elongated chamber 10 in the form of a rectangular box. Suspended from the top of the box 10 is a first metallic electrode 11 comprising an approximately quarter round brass bar mounted on adjustable insulated mounts 12 and 13 for adjusting the electrode gap spacing. Beneath the first electrode 11 is positioned a second structure consisting of a plurality of pins positioned longitudinally of the apparatus opposite to the first electrode 11. Adjacent each anode pin 14 is a capacitor 15, one capacitor being provided for each anode pin 14 and independently connected to the anode pin. At one end there is a 100 percent reflectivity curved mirror and at the other end of the structure a semitransparent reflector 17 both mounted on a suitable adjustable mounting. The curved mirror 16 and the semitransparent reflector 17 are connected to the box structure 10 by flexible rings 18 and 19 which may be of any suitable material, for example rubber.

Referring to FIG. 2 there are mounted on either side of the rectangular box 10 a plurality of charging resistors 20. A gas inlet 21 is provided in the side of the box structure 10 to admit the laser gas mixture.

FIG. 3 illustrates schematically the electrical diagram of the excitation system of the present invention. The capacitors 15 are connected to the anode pins 14 which are spaced from the cathode bar 11. The charging resistors 20 are connected between the anodes 14 and the cathodes 11. A voltmeter 22 is connected across the anode/cathode structure and in parallel with the spark gap 23. Direct current voltage is supplied by the high voltage transformer 24 and diode 25 to the spark gap 23 and to each of the capacitors 15 which are charged through the charging resistors 20. When a trigger pulse is applied to the spark gap system, the capacitors 15 are connected through the spark gap 23 causing a potential difference to appear between the anodes 14 and the cathode 11 which serves to ionize the gas inside the enclosure 10 causing an evenly distributed electrical discharge between the anode and the cathodes. The discharge produced in the laser gas occurs in the space between the anode and cathode structures resulting in excitation of the laser gas as defined in the above referred prior application.

In the embodiment illustrated in FIG. 1 and 2 this electrode structure is disclosed utilizing a bar 11 and a plurality of pin electrodes 14 positioned opposite the bar. It should be appreciated that this only one form of electrode structure suitable for use in a system of the present invention. The effect of providing alternative electrode structures might be to increase the volume of laser gas which is excited by the electrodes system.

We claim:

1. A transverse excitation system for an atmospheric pressure carbon dioxide gas laser comprising a source of high voltage direct current, an electrode structure comprising a first electrode extending longitudinally of said laser and parallel to and on one side of the optical axis of said laser, and a plurality of pin electrodes aligned with said first electrode on the opposite side of said optical axis, each pin electrode extending toward the first electrode to permit an electrical discharge to occur between each of said pin electrodes and said first electrode, means for connecting said high voltage source to said electrode structure, said first electrode being connected to one side of said high voltage source and each of said pin electrodes being connected to the other side of said source through a separate capacitor, each of said separate capacitors having substantially the same capacitance value, a charging resistor connected between each pin electrode and said first electrode to provide a charging path for each of said capacitors, a triggered spark gap connected across said source of high voltage direct current, whereby on operation of said spark gap, each of said capacitors is discharged through a path including said first electrode and the associated pin electrode.

* * * * *